(12) United States Patent
Forrest et al.

(10) Patent No.: US 6,694,343 B2
(45) Date of Patent: Feb. 17, 2004

(54) METHOD FOR SOLVING A LARGE SPARSE TRIANGULAR SYSTEM OF LINEAR EQUATIONS

(75) Inventors: John Joseph Forrest, Peekskill, NY (US); Nimrod Megiddo, Palo Alto, CA (US); John Anthony Tomlin, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 09/778,937

(22) Filed: Feb. 8, 2001

(65) Prior Publication Data

US 2002/0138537 A1 Sep. 26, 2002

(51) Int. Cl.⁷ .............................. G06F 7/32; G06F 7/38
(52) U.S. Cl. ....................................... 708/520; 708/446
(58) Field of Search ......................... 708/520, 443–444, 708/446

(56) References Cited

U.S. PATENT DOCUMENTS

| | | | | |
|---|---|---|---|---|
| 4,787,057 A | * | 11/1988 | Hammond | 708/607 |
| 5,200,915 A | * | 4/1993 | Hayami et al. | 708/520 |
| 5,301,342 A | * | 4/1994 | Scott | 708/520 |
| 5,905,666 A | * | 5/1999 | Hoffman et al. | 708/520 |
| 5,983,230 A | * | 11/1999 | Gilbert et al. | 708/520 |
| 6,446,105 B1 | * | 9/2002 | Washio et al. | 708/520 |
| 6,470,368 B1 | * | 10/2002 | Garg et al. | 708/446 |
| 6,601,080 B1 | * | 7/2003 | Garg | 708/502 |

* cited by examiner

Primary Examiner—Tan V. Mai
(74) Attorney, Agent, or Firm—Lacasse & Associates LLC; Randy W. Lacasse; Marc D. McSwain

(57) ABSTRACT

A computer-based method and system comprising three data structures: partially ordered data structure (or simply ordered data structure), contiguous list v, and vector p, is used for solving a large sparse triangular system of linear equations which utilizes only the non-zero components of a matrix to solve large sparse triangular linear equations and generates explicitly only the non-zero entries of the solution. A list of the row indices of the known non-zero values of x which require further processing is stored in the ordered data structure. Actual non-zero values of x are stored in the contiguous list v and the corresponding pointers to the location of these values are stored in the vector p. The computer-based method manipulates these three matrices to find a solution to an upper or lower sparse triangular system of linear equations. In addition, in the instance a matrix becomes dense (or increases in density) by the presence of many active rows, a partitioning method is described via which the dense matrix problem is solved.

13 Claims, 6 Drawing Sheets

METHOD FOR SOLVING A LARGE SPARSE TRIANGULAR SYSTEM OF LINEAR EQUATIONS

BACKGROUND OF THE INVENTION

1. Field of Invention

The present invention relates generally to the field of solving a system of linear equations. More specifically, the present invention is related to a computer-based method and a system for solving a large sparse triangular system of linear equations.

2. Discussion of Prior Art

Most natural phenomenon are modeled or simulated using a system of linear equations. Solving linear equations can be computationally intensive depending on the dimensions of the matrices involved.

FIG. 1 illustrates a general method of solving a system of linear equations and is given by:

$$Ax=b \qquad (1)$$

Matrix 106 (of dimension n×n) represents the array or matrix representative of vector A; matrix 108 represents the array or matrix representative of vector x (of dimension 1×n); and array or matrix 110 represents the array or matrix representative of vector b (of dimension 1×n). Solving the system of linear equations of (1) in terms of x as given below:

$$x=A^{-1}b=Wb \qquad (2)$$

where $$W=A^{-1} \qquad (3)$$

Equation (2) provides for a solution to the system of linear equations given by 100. Thus, the system of linear equations, in matrix form, given by 100 can be rewritten, as in 102, in terms of the matrix or array representative of x, wherein the matrix given by 112 is the inverse of A, denoted $A^{-1}$. The inverse of matrix A or $A^{-1}$ 112 can further be presented and replaced by another matrix W 114 as in (3). The computation of x as described in 104 represents a solution to the system of linear equations given by (1) and as the dimension n of the matrices involved (108, 114, and 110) increases, so does the computational overhead of a processor trying to perform that operation.

Sparse matrices (i.e., very few non-zero elements) arise more frequently than dense matrices (i.e., very few zero elements). An example of a general structure of a sparse 4×4 square matrix is given below:

$$S = \begin{bmatrix} s_{11} & 0 & 0 & s_{14} \\ 0 & 0 & 0 & 0 \\ 0 & 0 & 0 & s_{34} \\ 0 & 0 & 0 & 0 \end{bmatrix} \qquad (4)$$

wherein the elements $s_{11}$, $s_{14}$, and $s_{34}$ are the only non-zero elements in (4). The diagonal of a square matrix (n×n) divides it into two halves and helps define two kinds of sparse matrices: upper-triangular or lower triangular. If the block below the diagonal consists of zeros, the matrix is said to be upper triangular. For example, the matrix shown below is upper triangular:

$$U = \begin{bmatrix} 0 & s_{12} & 0 & s_{14} \\ 0 & 0 & 0 & 0 \\ 0 & 0 & 0 & s_{34} \\ 0 & 0 & 0 & 0 \end{bmatrix} \qquad (5)$$

In contrast to (5), if the block above the diagonal consists of zeros, then the matrix is said to be lower-triangular. An example of a lower triangular matrix is shown below:

$$L = \begin{bmatrix} 0 & 0 & 0 & 0 \\ 0 & 0 & 0 & 0 \\ 0 & s_{32} & 0 & 0 \\ s_{41} & 0 & 0 & 0 \end{bmatrix} \qquad (6)$$

Matrices that are representative of a system of linear equations that simulate real life phenomenon are usually either lower (5) or upper (6) triangular and the traditional methods of solving such equations create undue computational burden on the processor. Standard methods of solving each systems may take too much time since they do not take advantage of the presence of many zero entries in a sparse matrix. Thus, they handle each entry of the sparse matrix in sequence, and generate the entries of the solution matrix, x in the case of (2), one at a time, even though many or most of them may be equal to zero. Therefore, there is a need for a system which overcomes the shortcomings of prior methods (that perform more than necessary computations) and utilizes only the non-zero components of a matrix to solve large sparse triangular linear equations and generate explicitly only the non-zero entries of the solution.

Whatever the precise merits, features and advantages of prior methods, none of them achieve or fulfills the purposes of the present invention. The current invention provides for a system that takes advantage of sparse structure of matrices (upper or lower triangular) and maintains an ordered data structure and a pair of ordered vectors that contains only the non-zero indices, their respective values, and pointers to these values. Thus the invention teaches how to solve the system more efficiently without generating zero entries of the solution explicitly. These and other objects are achieved by the detailed description that follows.

SUMMARY OF THE INVENTION

The present invention provides for a computer-based system and a method for solving a large sparse triangular system of linear equations. The invention utilizes only the non-zero components of a matrix to solve large sparse triangular linear equations and generates explicitly only the non-zero entries of the solution.

The computer-based method and system comprises three data structures: partially ordered data structure (or simply ordered data structure), contiguous list v, and vector p. A list of the row indices of the known non-zero values of x which require farther processing is stored in the ordered data structure. Actual non-zero values of x are stored in the contiguous list v and the corresponding pointers to the location of these values are stored in the vector p. The present invention manipulates these three matrices to find a solution to an upper or lower sparse triangular system of linear equations. In addition, the present invention also takes into account the case wherein a matrix becomes dense (or increases in density) by the presence of many active rows. A partitioning method is described via which the dense matrix problem is solved.

DESCRIPTION OF THE PREFERRED EMBODIMENTS

Figure 1:
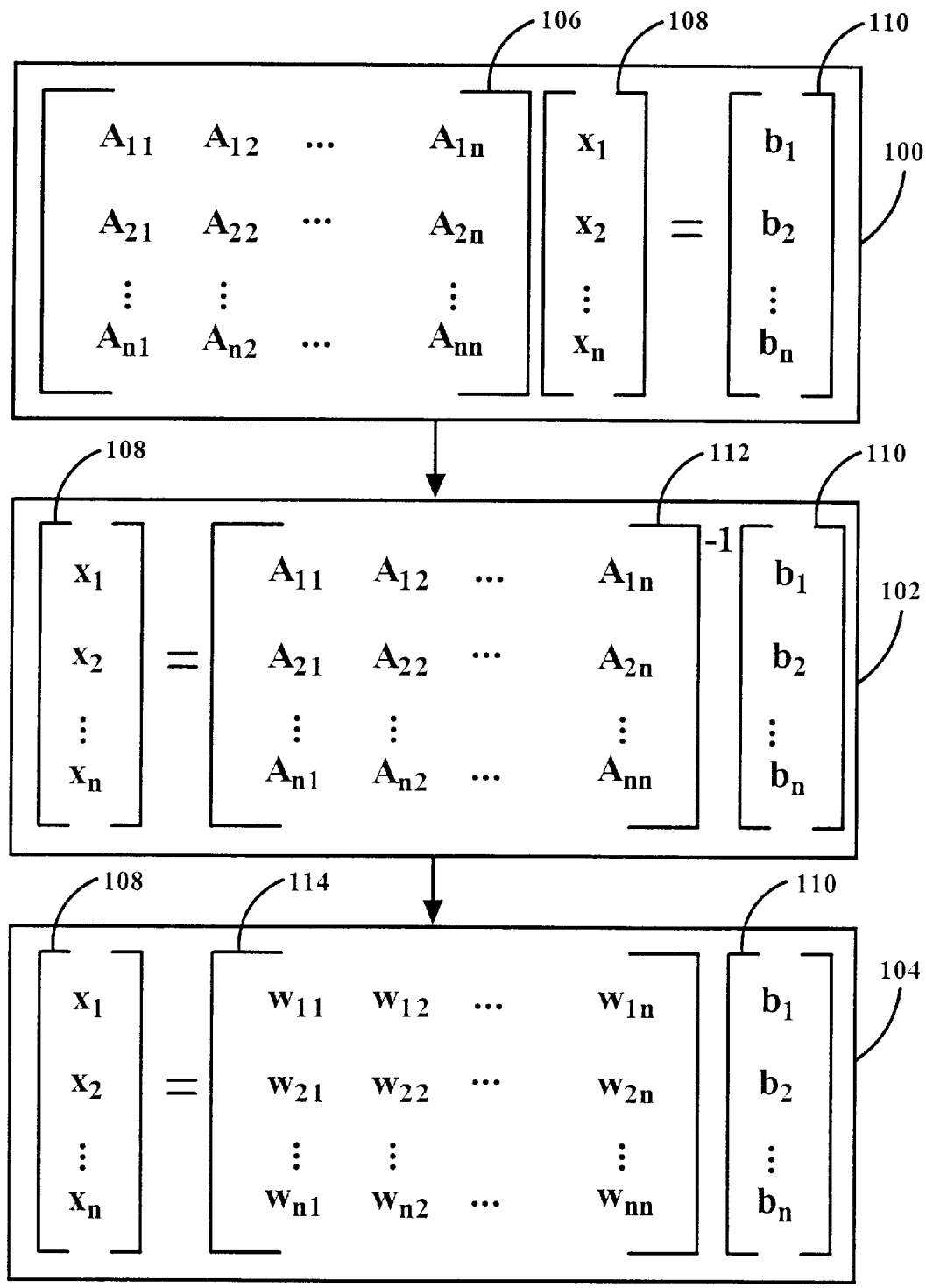
FIG. 1 illustrates a traditional method of solving a system of linear equations.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications for its construction and is not intended to limit the invention to the embodiment illustrated. Those skilled in the art will envision many other possible variations within the scope of the present invention.

A system of linear equations Ax=b has to be solved where A is a very large sparse triangular matrix of order n×n, b is a sparse n-vector, and x is the n-vector that has to be calculated. If A is upper triangular it is denoted by U, and if it is lower triangular it is denoted by L. The invention teaches how to solve the system more efficiently by generating explicitly only the non-zero entries of the solution.

Figure 2:
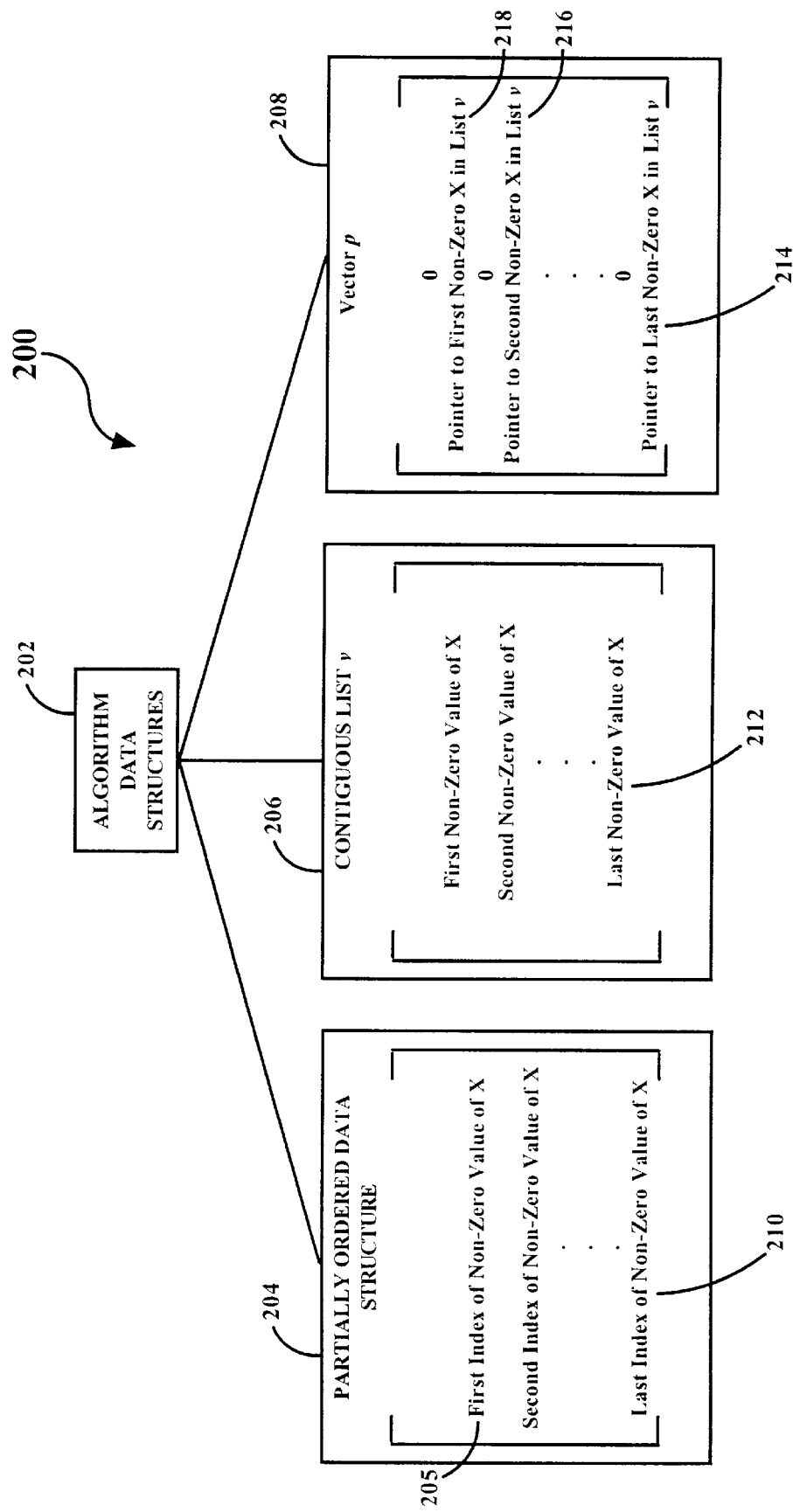
FIG. 2 illustrates the algorithm data structure of the present system.

In its simplest form, the system and method comprise a computer-based algorithm 200, described in FIG. 2, that maintains the following computer stored and manipulated data structures 202:

(a) An efficient Partially Ordered (or simply Ordered) Data Structure 204 of the rows corresponding to known non-zero values 210 in x which require further processing. For brevity this will be referred to simply as an "ordered data structure" 204.

(b) a contiguous list v 206, of size n, contains the accumulated nonzero values 212 themselves. For further efficiency, the row indices i associated with these values are kept with them.

Figure 3:
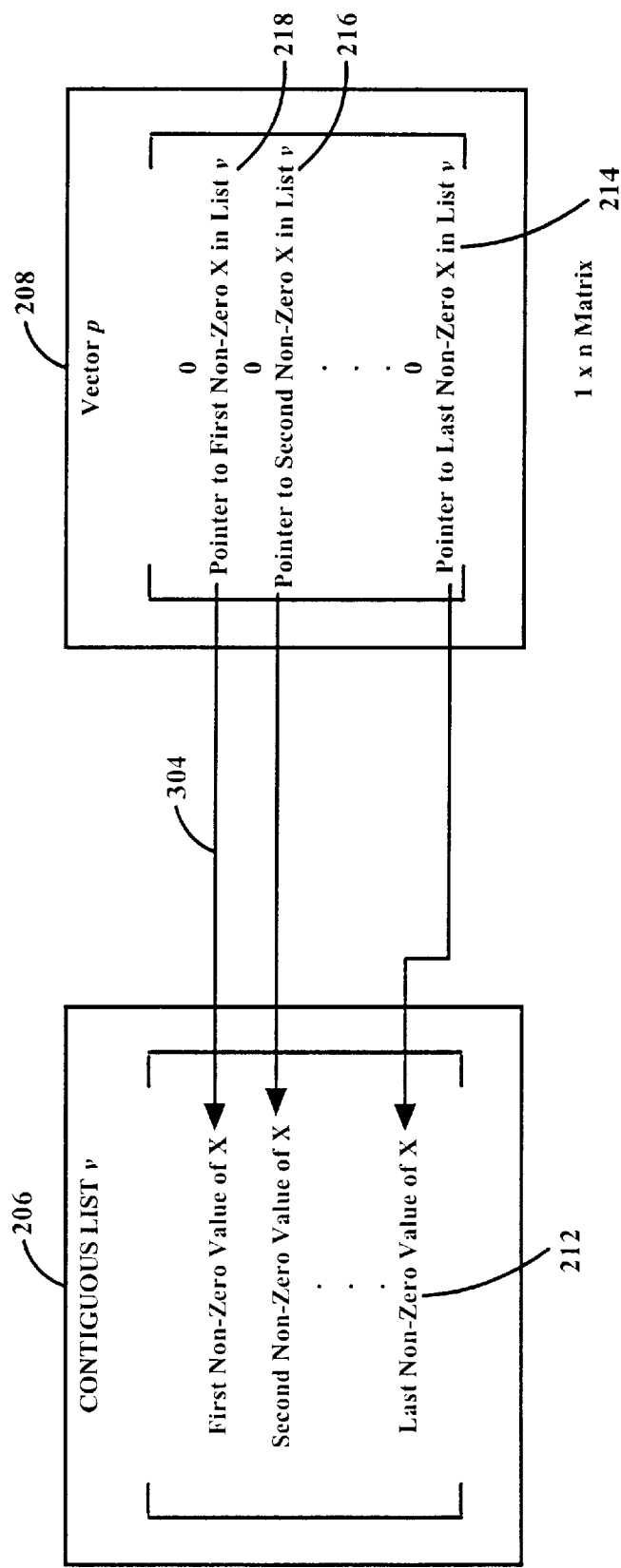
FIG. 3 illustrates the relationship between vectors v and p.

(c) a vector p 208, of size n, which is zero except in those positions (214, 216, and 218) which correspond to a nonzero x, in which case, as shown in FIG. 3, the value in p 208 points to 304 the location of this x value in the list v 206.

The columns of A (whether a lower triangle L, or an upper triangle U) are stored columnwise in their sparse form, so the length of the representation of each column is proportional to the number of non-zero entries in the column rather than its dimension, and scanning it means enumerating only the non-zero entries.

Figure 4:
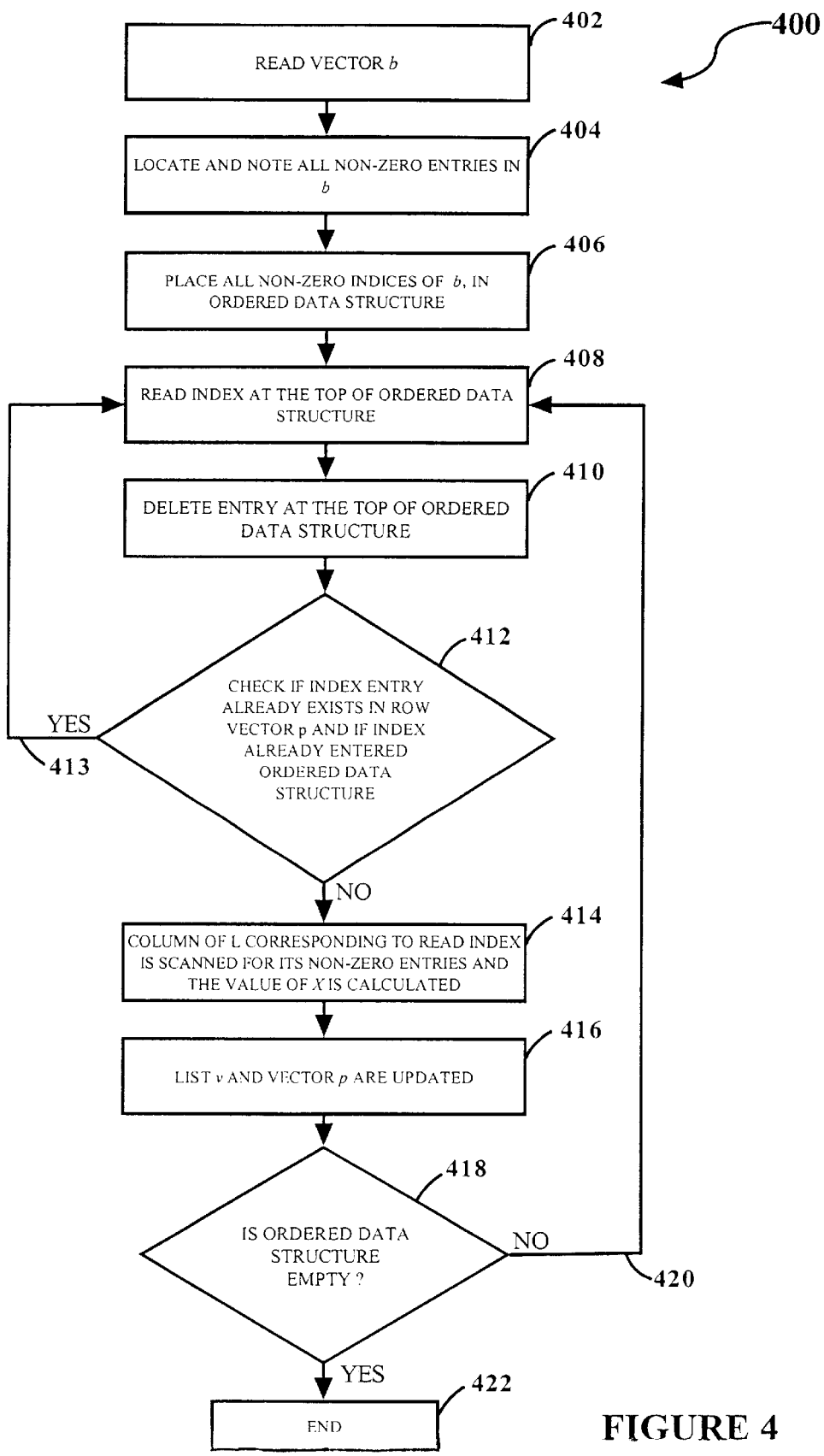
FIG. 4 illustrates the overall method for solving a large sparse triangular system of linear equations.

As described in FIG. 4, in the case of the lower triangular matrix L, as an initialization step, the procedure starts by reading vector b 402, locating 404, and placing 406 in the ordered data structure 204 all the row indices where b has a non-zero entry. Assuming no entry in x would vanish due to numerical cancellations, each entry of x with an index corresponding to one of the non-zero entries of b is initially non-zero and is placed in the compressed vector described above 204. Thus at the start, the index 205 at the top of the ordered data structure 204 is the smallest index of a non-zero entry in b. This is also the smallest index 205 of a non-zero entry in x. The algorithm works in steps, as described below, until the ordered data structure 204 is empty.

As a next step, the index currently at the top of the ordered data structure 204 is read 408 and removed 410 from the structure 204. The entry in the row vector p 208 indicates whether this index has already entered the ordered data structure 204. If the row index is not already in the ordered data structure 204 (i.e. check to see if the entry in p is zero 412), it is added to the structure 204. The column of L corresponding to this index is scanned for its non-zero entries 414 and a new entry added to the list v 206 of nonzero x values and p 208 is updated to point to this new value 416. Otherwise 413, the pointer to the current x value in v 206 is extracted from p 208 and the next index at the top of the structure 204 is read 408. The contribution of the corresponding entry of the column to the value of the corresponding entry of x is added to the accumulator that generates that entry for x in the list v. Next, the algorithm checks to see if the ordered data structure 204 is empty 418, and if it in fact it is empty, the computations are terminated 422. Otherwise, the next index at top of the structure is read 420. At the end of the procedure (when the ordered data structure is empty), the nonzero values of x are to hand in the list v 206 together with their indices.

It should be noted that, in the instance that A is an upper triangular matrix U, the ordered data structure 204 is constructed with the largest nonzero row index at the top and an analogous procedure is carried out treating the columns of U in reverse order.

It should also be noted that there are many possible embodiments of the efficient ordered data structure 204. The heap (a partially ordered structure) is perhaps the simplest that would be suitable for this invention. However, it is only one of a number of list processing techniques which could be used to maintain the sequence of "active" rows. Those skilled in the art will envision other data structures such as, but not limited to, priority queues or sorted lists that may also be used and the choice of the best one depends on the particular parameters of the instances that need to be solved such as size, density and expected number of nonzero entries in the solution.

Well-known theoretical properties of heaps (and related processes) guarantee that the work involved in maintaining the structure will be small compared with the indexing and arithmetic as long as the vector x remains sparse. On dense problems, the overhead of updating the heap every time a new nonzero x is created may lead to a loss of efficiency. In general, such an increase in density cannot be guaranteed not to happen. To guard against this, the invention is extended to provide a method of partitioning.

Figure 5:
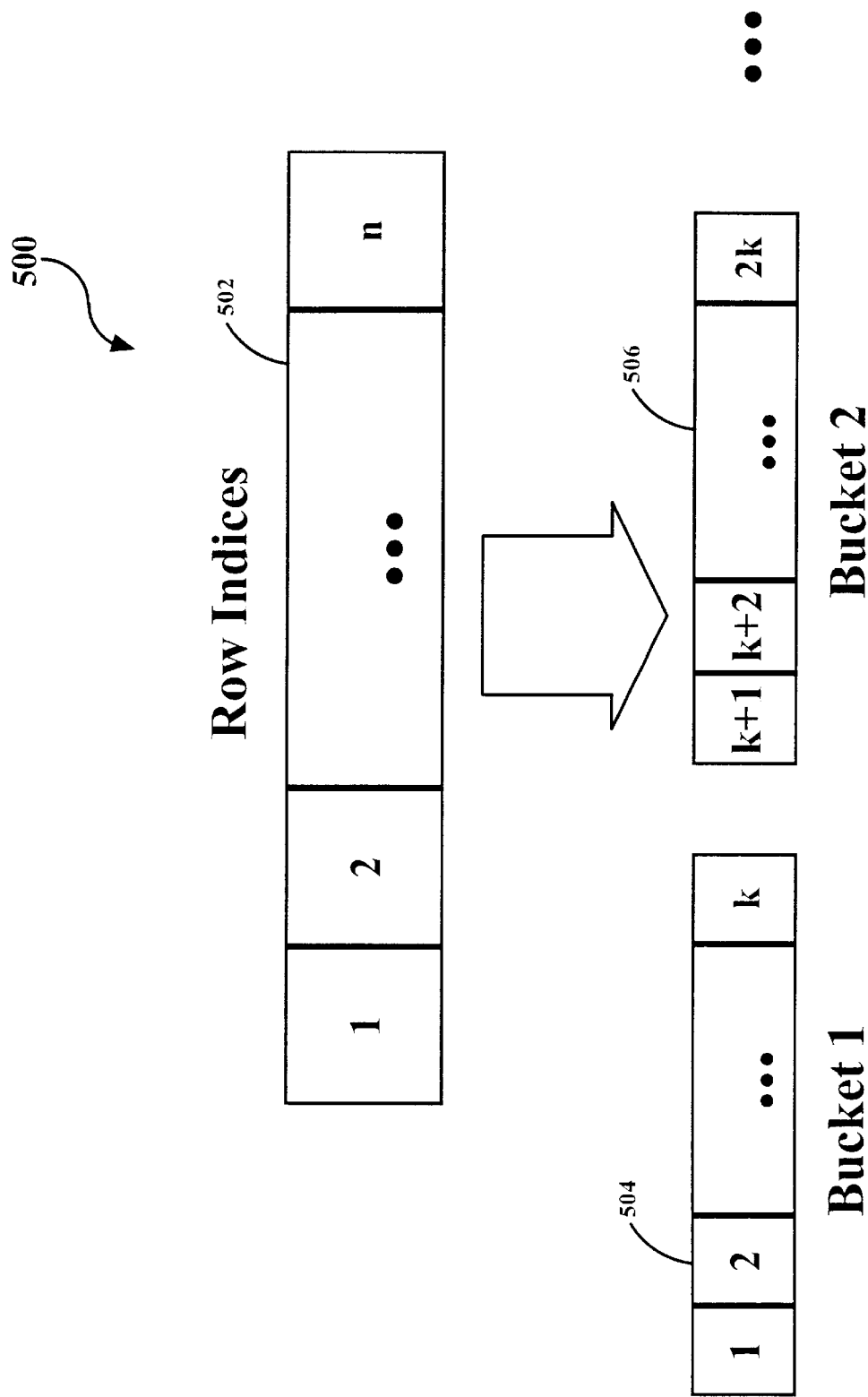
FIG. 5 illustrates the partitioning method.

In the partitioning method, as described in FIG. 5, the set of all row indices 1, ..., n 502 is partitioned into a number of "buckets" m (typically m may be 16) wherein bucket 1 504 consists of rows 1, ..., k, bucket 2 506 consisting of rows k+1, ..., 2k, and so on where k is given by:

$$k = \frac{(n + m - 1)}{m} \qquad (7)$$

Figure 6:
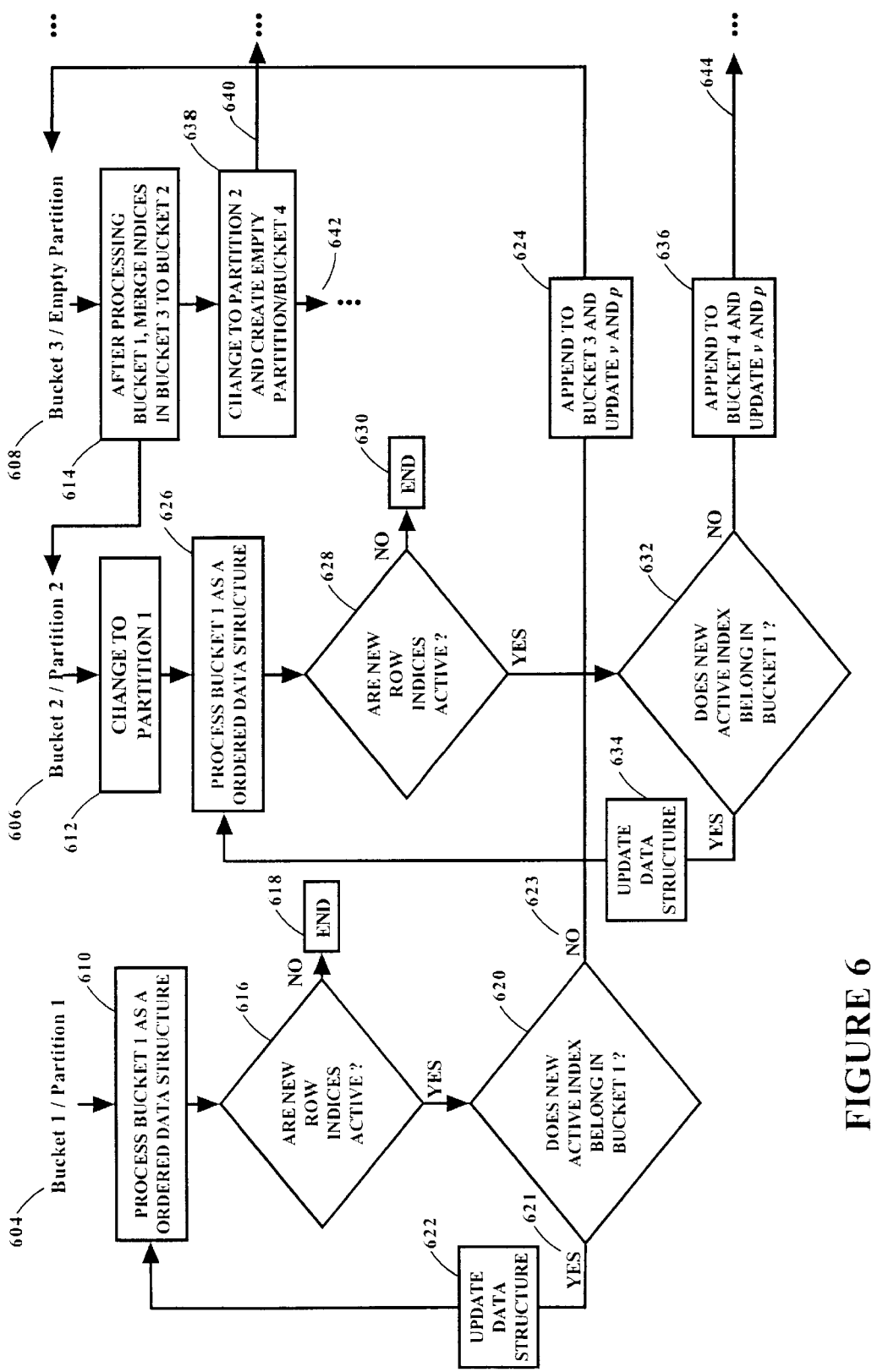
FIG. 6 illustrates overall method that utilizes the partitioning method and the data structures to solve a large sparse triangular system of linear equations.

As shown in FIG. 6, the initial list of active rows (those with a nonzero value in b) 502 is split into two partitions. Those in the first non-empty bucket are put in the fist partition 604 and readied for processing either as an ordered data structure 204. All remaining active rows are placed in a second partition 606 and readied for processing in the same way as the first partition. An initially empty third partition 608 is created. Process the first partition by the basic method 610 described above until its ordered data structure 204 is empty, but with the following modification. If new row indices become active 616 then:

a) If it is in the current (first) partition 621, update the data structures 622 as described in the basic invention above. If it is in the second partition 623, simply append the row to the third partition and update 624 v 206 and p 208.

b) When all rows in the first partition have been processed 618, redefine the partitions. Rows which have been appended to partition 3 608 are merged with the rows in partition 2 606. The first nonempty bucket in partition 2 606 now becomes partition 1. The non-zeros in bucket 3 608 become the new partition 2.

This partition procedure is carried out repeatedly until all rows have been processed.

The above system and its described functional elements are implemented in various computing environments. For example, the present invention may be implemented on a conventional IBM PC or equivalent, multi-nodal system (e.g. LAN) or networking system (e.g. Internet, WWW). All programming and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of solving linear equations.

CONCLUSION

A system and method has been shown in the above embodiments for the effective implementation of a system and a method for solving a large sparse triangular system of linear equations. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing. In addition, the specific chosen data structures and partitioning schemes are representative of the preferred embodiment and should not limit the scope of the invention.

What is claimed is:

1. A computer-based method of solving a sparse triangular system of linear equations $Ax=b$, said method comprising:

retaining in computer storage an ordered data structure containing indices of all non-zero values of said vector x;

compiling a contiguous list v of all non-zero values of said vector x;

identifying a vector p of pointers that point to the non-zero values of said vector x in said list v;

reading said vector b;

identifying all non-zero entries in said vector b;

placing all non-zero indices of b in said ordered data structure;

reading the index at the top of said ordered data structure;

deleting said read index from said ordered data structure;

returning to said step of reading the index at the top of said ordered data structure if said index already exists in said vector p, else reading a column of said vector A corresponding to said read index if said index does not already exist in said vector p;

calculating a value x from said read column of said vector A;

updating v and p based on said calculated value of x;

returning to said earlier step of reading said index at the top of said ordered data structure if said ordered data structure is not empty, and ending computations if said ordered data structure is empty.

2. A computer-based method of solving a sparse triangular system of linear equations $Ax=b$, as per claim 1, wherein said ordered data structure is a partially ordered data structure.

3. A computer-based method of solving a sparse triangular system of linear equations $Ax=b$, as per claim 1, wherein said ordered data structure is a heap.

4. A computer-based method of solving a sparse triangular system of linear equations $Ax=b$, as per claim 1, wherein said ordered data structure is a priority queue.

5. A computer-based method of solving a sparse triangular system of linear equations $Ax=b$, as per claim 1, wherein said ordered data structure is a sorted list.

6. A computer-based method of solving a sparse triangular system of linear equations $Ax=b$, as per claim 1, wherein said method is used in computer modeling or simulation.

7. A computer-based method of solving a sparse triangular system of linear equations $Ax=b$ comprising:

reading all row indices of said active rows of vector x;

partitioning said row indices of active rows into multiple buckets;

splitting the initial list of said row indices of active rows into two partitions;

loading said partitioned row indices into a first bucket and second bucket respectively;

loading a third bucket with zeros;

processing data in said first bucket, wherein said step of processing data in said buckets comprises:

retaining in computer-storage an ordered data structure containing indices of all the non-zero values of said vector x;

compiling a contiguous list v of all non-zero values of said vector x;

identifying a vector p of pointers that point to the non-zero values of said vector x in said list v;

reading said vector b;

identifying all non-zero entries in said vector b;

placing all non-zero indices of b in said ordered data structure;

reading the index at the top of said ordered data structure;

deleting said read index from said ordered data structure;

returning to step of reading the index at the top of said ordered data structure if said index already exists in said vector p;

reading a column of said vector A corresponding to said read index if said index does not already exist in said vector p;

calculating a value x from said read column of said vector A;

updating v and p based on said calculated value of x;

returning to said earlier step of reading said index at the top of said ordered data structure if said ordered data structure is not empty, and ending computations if said ordered data structure is empty, ending computations if no more of said active rows exist;

updating said data structure if said active row index belongs to bucket one;

appending said active row index to said third bucket if said active row index does not belong to bucket one;

appending said third bucket to said second bucket after processing of said first partition;

changing said second bucket to said first bucket after processing of said first partition;

changing the third bucket to second bucket;

loading the fourth partition with zeros if said third bucket is changed to said second bucket, and changing said fourth partition to third bucket if said fourth partition is loaded with zeros, repeatedly performing the above steps repeatedly until all said active row indices in all said buckets are processed.

8. A computer-based method of solving a sparse triangular system of linear equations Ax=b, as per claim 7, wherein said ordered data structure is a partially ordered structure.

9. A computer-based method of solving a sparse triangular system of linear equations Ax=b, as per claim 7, wherein said ordered data structure is a heap.

10. A computer-based method of solving a sparse triangular system of linear equations Ax=b, as per claim 7, wherein said ordered data structure is a priority queue.

11. A computer-based method of solving a sparse triangular system of linear equations Ax=b, as per claim 7, wherein said ordered data structure is a sorted list.

12. A computer-based method of solving a sparse triangular system of linear equations Ax=b, as per claim 7, wherein said method is used in computer modeling and simulation.

13. An article of manufacture comprising a computer usable medium having computer readable code embodied therein which solves a sparse triangular system of linear equations Ax=b, said computer readable code comprising:

computer readable program code maintaining an ordered data structure;

computer readable program code maintaining a contiguous list v of all non-zero values of said vector x;

computer readable program code maintaining a vector p of pointers that point to the values of said vector b;

computer readable program code identifying all non-zero entries in said vector b;

computer readable program code placing all non-zero elements of b in said ordered data structure;

computer readable program code reading the index at the top of said ordered data structure;

computer readable program code deleting said read index from the said ordered data structure;

computer readable program code returning to said step of reading the index at the top of said ordered data structure if said index already exists in vector p;

computer readable program code reading column of said vector A corresponding to said read index if said index does not already exist in said vector p;

computer readable program code calculating a value x from said read column of said vector A;

computer readable program code updating v and p based on said calculated value of x;

computer readable program code returning to said earlier step of reading said index at the top of said ordered data structure if said data structure is not empty, and computer readable code ending computations if said ordered data structure is empty.

* * * * *